United States Patent [19]

Neissel

[11] Patent Number: 4,582,673
[45] Date of Patent: Apr. 15, 1986

[54] FISSION-CHAMBER-COMPENSATED SELF-POWERED DETECTOR FOR IN-CORE FLUX MEASUREMENT AND REACTOR CONTROL

[75] Inventor: John P. Neissel, San Jose, Calif.

[73] Assignee: General Electric Company, San Jose, Calif.

[21] Appl. No.: 531,419

[22] Filed: Sep. 12, 1983

[51] Int. Cl.⁴ ............................................. G21C 17/00
[52] U.S. Cl. ..................................... 376/255; 376/259
[58] Field of Search ............... 376/255, 254, 259, 154; 250/374, 391

[56] References Cited

U.S. PATENT DOCUMENTS

| | | | |
|---|---|---|---|
| 2,874,304 | 2/1959 | Lichtenstein | 250/374 |
| 2,982,473 | 5/1961 | Goertzel | 376/259 |
| 3,043,954 | 7/1962 | Boyd et la. | 376/154 |
| 3,565,760 | 2/1971 | Parkos et al. | 376/254 |
| 3,760,183 | 9/1973 | Neissel | 376/254 |
| 4,103,166 | 7/1978 | Niessel et al. | 250/391 |
| 4,493,811 | 1/1985 | Seki et al. | 376/259 |

OTHER PUBLICATIONS

IEEE Trans. on Nuc. Sci. (2/76), NS-23, No. 1, pp. 311-316, Banda et al., "Dynamic Compensation of Rhodium Self Powered Neutron Detectors".

"A PENA-Detector Flux Measuring System with a Fast Response", Johnstone (3/71), Research Reactors Div. UKAEA Research Group, Atomic Energy Research Establishment.

*Primary Examiner*—Salvatore Cangialosi
*Attorney, Agent, or Firm*—Ivor J. James, Jr.; Samuel E. Turner; Raymond G. Simkins

[57] ABSTRACT

A rhodium self-powered detector, a fission chamber, and appropriate electronic circuitry for combining the output of the self-powered detector and the fission chamber are disclosed in combination wherein the combined output of the self-powered detector and the fission chamber is always proportional to the local reactor power level or neutron flux density in a nuclear reactor.

18 Claims, 6 Drawing Figures

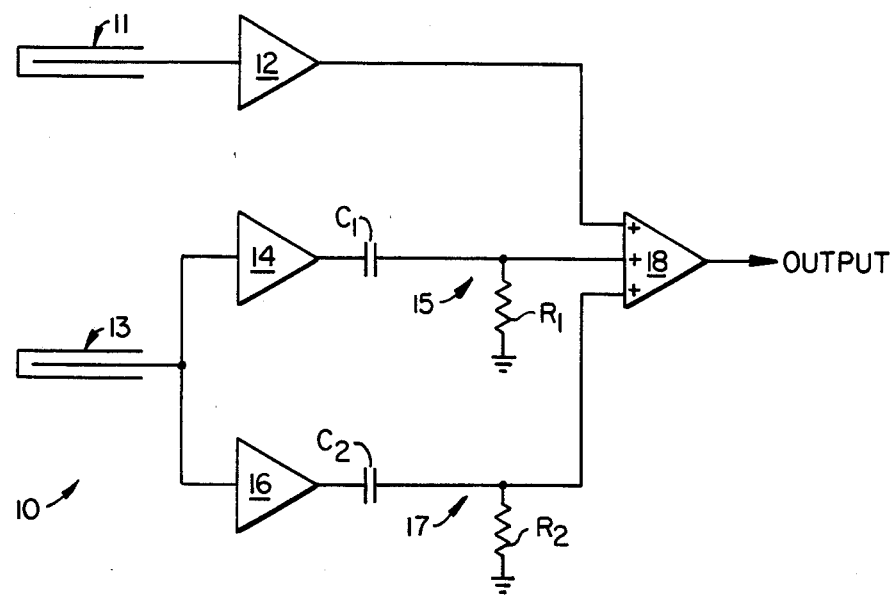
FIG._1.
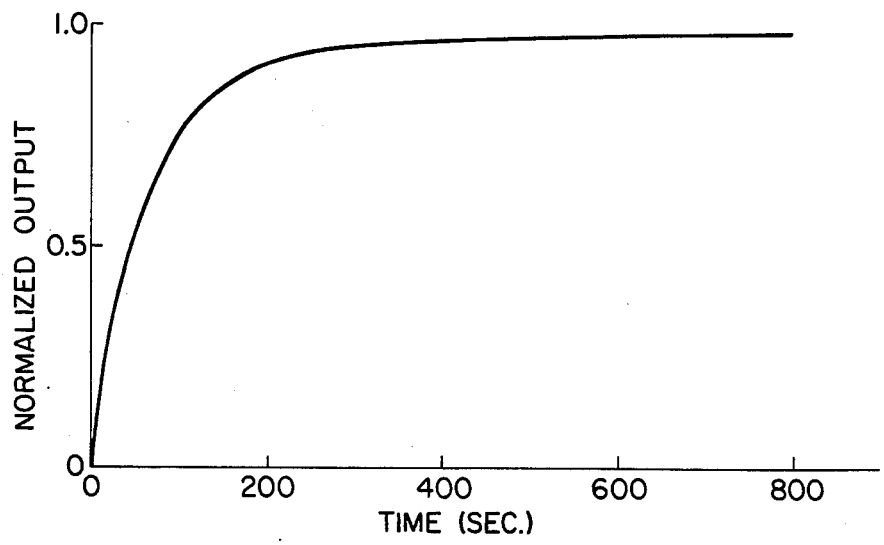
FIG._2.

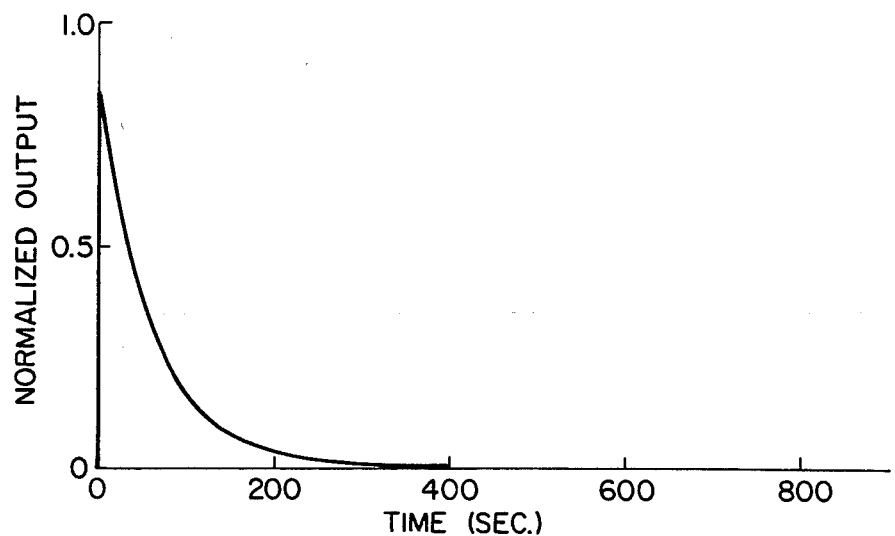
FIG._3.
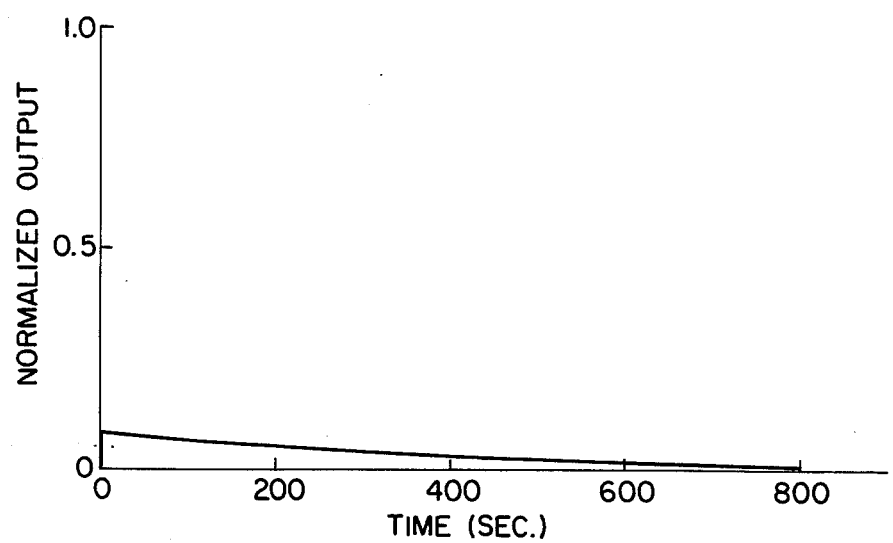
FIG._4.

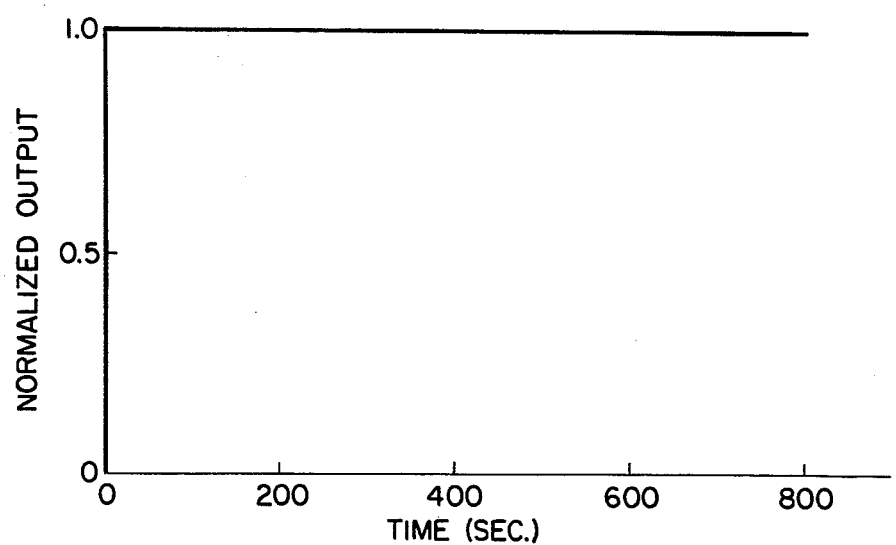
FIG._5.
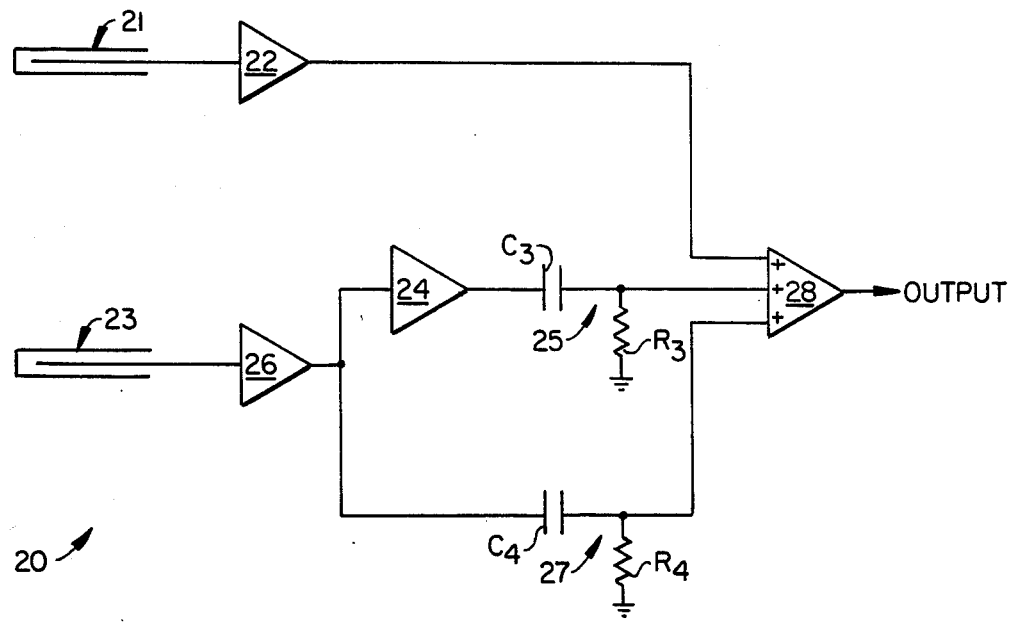
FIG._6.

FISSION-CHAMBER-COMPENSATED SELF-POWERED DETECTOR FOR IN-CORE FLUX MEASUREMENT AND REACTOR CONTROL

BACKGROUND OF THE INVENTION

1. Field of the Invention

The present invention relates to nuclear reactors. More particularly, the present invention relates to a self-powered detector for in-core measurement of local reactor power level and neutron flux density.

2. Description of the Prior Art

Present day fission chambers that are used in the core of a nuclear reactor contain a ceramic seal between the chamber and its integral coaxial cable. The purpose of this seal is to maintain a constant quantity of gas in the fission chamber in order to provide a neutron sensitivity that is independent of the temperatures of the chamber and its integral cable. A majority of these seals develop leaks during the exposure interval $10^{21}$ to $10^{22}$ nvt, after which interval the chamber loses its desirable property of temperature-independent neutron sensitivity. The chamber then suffers from a larger nonlinearity with reactor power level, a change in sensitivity after a cold start-up, and, in the case of bottom-entry detectors, a change in sensitivity after a change in rod bank position or in power level.

Self-powered neutron detectors do not depend upon the gas in the sensitive region for their current output. Accordingly, no seal is required between the detector and its integral cable. Thus, neutron sensitivity is independent of the temperature of the detector and that of its integral cable. Such detectors are useful for measuring local power level or neutron flux density after the reactor has been in a steady state for several minutes, but, because of their slow speed of response, they do not give correct readings immediately after a power level change. They cannot be used to provide a warning or a scram signal if the reactor power level becomes too high, as in-core fission chambers are often called upon to do in water reactors.

For example, after a step change in local neutron flux density, the output of a rhodium self-powered detector changes 61% of the flux density change in one minute, 82% in two minutes, 90% in three minutes, 96% in five minutes, and 98% in ten minutes. It is readily apparent the detector-based reading can be in serious error for the first five or ten minutes of operation. Such dilatory response is undesirable in a nuclear reactor.

Pertinent prior art publications include: U.S. Pat. No. 2,874,304, entitled "Ionization Chamber", issued to Lichtenstein on Feb. 17, 1959; U.S. Pat. No. 3,043,954, entitled "Fission Chamber Assembly", issued to Boyd et al. on July 10, 1982; U.S. Pat. No. 3,565,760, entitled "Nuclear Reactor Power Monitor System", issued to Parkos et al. on Feb. 23, 1971; U.S. Pat. No., 4,103,166, entitled "Method and Apparatus for Monitoring the Output of a Neutron Detector", issued to Neissel et al. on July 25, 1978; U.S. Pat. No. 3,760,183, entitled "Neutron Detector System", issued to Neissel on Sept. 18, 1973; and the publications *Dynamic Compensation of Rhodium Self-Powered Neutron Detectors*, Banda et al., IEEE Transactions on Nuclear Science, Vol. NS-23, No. 1 (February 1976), and *A Pena-Detector Flux-Measure System With A Fast Response*, Johnstone, Research Reactors Div., U.K.A.E.A. Research Group, Atomic Energy Research Establishment (March 1971). So far as any of the above-mentioned patents might be considered necessary, either in whole or in part, to assist or enable one skilled in the art to practice the herein disclosed invention, they are hereby incorporated into this patent application by reference.

SUMMARY OF THE INVENTION

The present invention provides in combination a rhodium self-powered detector, a seal-less fission chamber, and appropriate electronic circuitry for combining the outputs of the self-powered detector and of the fission chamber in such a way that the combined output is always proportional to the local reactor power level or neutron flux density. The self-powered detector and fission chamber are located in close proximity to each other or can be combined as one unit as shown in U.S. Pat. No. 3,760,183, "Neutron Detector System", J. P. Neissel.

BRIEF DESCRIPTION OF THE DRAWINGS

FIG. 1 is a block diagram of a first preferred embodiment of the present invention;

FIG. 2 is a graph plotting the output of amplifier 12, shown in FIG. 1, as a function of time;

FIG. 3 is a graph plotting the output of differentiating circuit 15, shown in FIG. 1, as a function of time;

FIG. 4 is a graph plotting the output of differentiating circuit 17, shown in FIG. 1, as a function of time;

FIG. 5 is a graph plotting the output of summing amplifier 18, shown in FIG. 1, as a function of time; and FIG. 6 is a block diagram of another preferred embodiment of the present invention.

DETAILED DESCRIPTION OF A PREFERRED AND ALTERNATE EMBODIMENT

The preferred embodiment of the present invention is shown in FIG. 1, including a rhodium self-powered neutron detector 11, an amplifier 12, a seal-less fission chamber 13, an amplifier 14, a differentiating circuit 15 with time constant $T_1/\ln 2$ (determined by a capacitor C1 and a resistor R1, where $T_1$ is the half-life of the ground state of $Rh^{104}$), an amplifier 16, a differentiating circuit 17 with time constant $T_2/\ln 2$ (determined by a capacitor C2 and a resistor R2, where $T_2$ is the half-life of the isometric state of $Rh^{104}$), and a summing amplifier 18. The outputs of amplifier 12, differentiating circuit 15, and differentiating circuit 17, after a step in flux density, are shown in FIGS. 2, 3, and 4, respectively, and their sum, or the output of summing amplifier 18, is shown in FIG. 5.

The self-powered detector 11 can be considered as the primary signal source and, in fact, it is the only signal source under steady-state conditions. Fission chamber 13 supplies only the transient information that is missing from the self-powered-detector signal for a short time after a neutron flux level change. Accordingly, the output signal produced by the present invention is only subject to the fission-chamber errors inherent and persistent in prior art devices for a short time after a neutron flux density change.

Another preferred embodiment of the invention that has certain advantages (discussed below) over the embodiment shown in FIG. 1, is shown in FIG. 6 and includes a rhodium neutron detector 21, amplifier 22, a seal-less fission chamber 23, an amplifier 26, an amplifier 24, a first differentiating circuit 25 with a time constant $T_1/\ln 2$ (determined by a capacitor C3 and resistor R3, where $T_1$ is the half-life of the ground state of $Rh^{104}$), a second differentiating circuit 27 with a time constant $T_2/\ln 2$ (determined by a capacitor C4 and a resistor R4, where $T_2$ is the half-life of the isomeric state of $Rh^{104}$), and a summing amplifier 28.

The fission chamber should preferably contain a regenerative sensitive coating consisting of a mixture of $U^{234}$ and $U^{235}$. It may or may not contain a gas seal between the chamber and cable volumes.

The center conductor of a cylindrical rhodium self-powered neutron detector, such as detector 11 or 21 consists of 100% $Rh^{103}$. In a neutron flux, some of the $Rh^{103}$ atoms transmute to the ground state of $Rh^{104}$ which then decay by beta emission to stable $Pd^{104}$; and some of the $Rh^{103}$ atoms transmute to the isomeric or metastable state of $Rh^{104}$ which then decay be isomeric transition to the ground state of $Rh^{104}$. Hence the equations describing the numbers of isomeric-state and ground-state $Rh^{104}$ atoms are:

$$\frac{dN_{4m}}{dt} = \phi\sigma_{4m}N_3 - \lambda_{4m}N_{4m} \qquad (1)$$

$$\frac{dN_4}{dt} = \phi\sigma_4 N_3 + \lambda_{4m}N_{4m} - \lambda_4 N_4 \qquad (2)$$

where
$N_{4m}$ = number of isomeric-state $Rh^{104}$ atoms
$N_4$ = number of ground-state $Rh^{104}$ atoms
$N_3$ = number of $Rh^{103}$ atoms
$t$ = time
$\phi$ = neutron flux density
$\sigma_{4m}$ = cross section for the reaction $Rh^{103}(n,\gamma)Rh^{104m}$
$\sigma_4$ = cross section for the reaction $Rh^{103}(n,\gamma)Rh^{104}$
$\lambda_{4m}$ = decay constant for $RH^{104m}$
$\lambda_4$ = decay constant of $Rh^{104}$, and
$Rh^{104m}$ represents the isomeric-state of $Rh^{104}$.

Loss of $Rh^{103}$ due to burnup is neglected in this analysis of transient response. In addition, the detector current is given by $$I_1 = K\lambda_4 N_4 + K^1\phi \qquad (3)$$

where the first term on the right represents the current produced by the beta particles emitted during decay of $Rh^{104}$ and the second term represents a prompt current produced by prompt neutron reactions in the detector and its environment.

These three equations can be solved for $I_1$ for the case of a step function in $\phi_1$, i.e., for $$\phi = \begin{cases} 0, & t < 0 \\ \phi_1, & t \geq 0 \end{cases}$$

and the solution is $$\frac{I_1}{\phi_1} = \begin{cases} 0, & t < 0 \\ K^1 + KN_3\sigma[1 - (1-c)e^{-\lambda_4 t} - ce^{-\lambda_{4m} t}], & t \geq 0 \end{cases} \qquad (4)$$

where $$c = \frac{\sigma_{4m}\lambda_4}{\sigma(\lambda_4 - \lambda_{4m})}, \text{ and } \sigma = \sigma_4 + \sigma_{4m}. \qquad (5)$$

Notice that c is a calculable constant.

The current at time zero is $$\frac{I_1(0)}{\phi_1} = K^1 \qquad (6)$$

which is referred to as the prompt neutron sensitivity, $S_p$. The current after several hours is $$\frac{I(\infty)}{\phi_1} = K^1 + KN_3\sigma \qquad (7)$$

which is referred to as the sum of the prompt neutron sensitivity, $S_p$, and the delayed neutron sensitivity, $S_D$. Thus, the current for $t \geq 0$ is $$\frac{I_1}{\phi_1} = S_p + S_D[1 - (1-c)e^{-\lambda_4 t} - ce^{-\lambda_{4m} t}]$$

and the output of amplifier 12 (or 22) is $$\frac{V_{12}}{\phi_1} = G_{12}S_p + G_{12}S_D[1 - (1-c)e^{-\lambda_4 t} - ce^{-\lambda_{4m} t}] \qquad (9)$$

where $G_{12}$ = transimpedance of amplifier 12 (or 22).
But the desired output voltage is $$\frac{V_{out}}{\phi_1} = \begin{cases} 0, & t < 0 \\ \frac{V_{18}}{\phi_1}, & t \geq 0 \end{cases} \qquad (10)$$

and this can be obtained by adding to $V_{12}$, in the summing amplifier 18 (or 28), the following voltages which are obtained from the fission chamber 13 or 23 according to FIG. 1 or 6, respectively:

$$\frac{V_{15}}{\phi_1} = G_{12}S_D(1-c)e^{-\lambda_4 t} \qquad (11)$$

$$\frac{V_{17}}{\phi_1} = G_{12}S_D c e^{-\lambda_{4m} t} \qquad (12)$$

Referring to the embodiment of FIG. 1, we can write $$\frac{V_{15}}{\phi_1} = G_{14}S_{13}e^{-\lambda_4 t} \qquad (13\text{-}1)$$

$$\frac{V_{17}}{\phi_1} = G_{16}S_{13}e^{-\lambda_{4m} t} \qquad (14\text{-}1)$$

where
$G_{14}$ = transimpedance of amplifier 14
$G_{16}$ = transimpedance of amplifier 16, and
$S_{13}$ = neutron sensitivity of fission chamber 13.
So for perfect compensation, $$G_{16} = c\frac{S_D}{S_{13}}G_{12} \qquad (15\text{-}1)$$

and $$G_{14} = (1-c)\frac{S_D}{S_{13}}G_{12} \qquad (16\text{-}1)$$

which are obtained by combining equation (12) with equation (14-1), and equation (11) with equation (13-1). Referring to the embodiment of FIG. 6, we can write $$\frac{V_{25}}{\phi_1} = G_{24}G_{26}S_{23}e^{-\lambda_4 t} \tag{13-6}$$

$$\frac{V_{27}}{\phi_1} = G_{26}S_{23}e^{-\lambda_{4m}t} \tag{14-6}$$

So for perfect compensation, $$G_{26} = c\frac{S_D}{S_{23}}G_{22} \tag{15-6}$$

and $$G_{24} = \frac{1-c}{c} = \frac{\sigma_4\lambda_4 - \sigma\lambda_{4m}}{\sigma_{4m}\lambda_4} \tag{16-6}$$

which are obtained by combining equation (12) with equation (14-6), and equation (11) with equations (13-6) and (5). Note that, with the embodiment of FIG. 1, amplifiers 12, 14, and 16 must be adjusted as $S_D$ and $S_{13}$ change due to burnup; with FIG. 6, only amplifiers 22 and 26 must be adjusted, since the voltage gain of amplifier 24 is a calculable constant. Accordingly, the embodiment of FIG. 6 is initially easier to calibrate.

For perfect compensation, the output of amplifier 14 must be, from equation (11), $$\frac{V_{14}}{\phi} = G_{12}S_D(1-c) \tag{17}$$

and the output of amplifier 16 must be from equation (12), $$\frac{V_{16}}{\phi} = G_{12}S_D c \tag{18}$$

At steady state, the output of amplifier 12 is from equation (9), $$\frac{V_{12S}}{\phi} = G_{12}S_p + G_{12}S_D \tag{19}$$

Therefore, for perfect compensation, $$V_{14} = (1-c)\frac{S_D}{S_p + S_D}V_{12S} \tag{20}$$

from (17) and (19) and $$V_{16} = c\frac{S_D}{S_p + S_D}V_{12S} \tag{21}$$

from (18) and (19).

The adjustment procedure for the present invention is as follows:
At steady state:
1. Adjust amplifier 12 (or 22) to obtain the desired output from amplifier 18 (or 28).
2. For the case of the embodiment of FIG. 1, adjust amplifier 14 so its output is $$V_{14} = (1-c)\frac{S_D}{S_p + S_D}V_{12} \tag{22}$$

and adjust amplifier 16 so its output is $$V_{16} = c\frac{S_D}{S_p + S_D}V_{12} \tag{23}$$

3. For the case of the embodiment of FIG. 6, adjust amplifier 26 so the output of amplifier 24 is $$V_{24} = (1-c)\frac{S_D}{S_p + S_D}V_{22} \tag{24}$$

Note: the values of the constants used above are:

$$c = 0.092 \tag{25}$$
$$1 - c = 0.908 \tag{26}$$

$$\frac{S_D}{S_p + S_D} = 0.93 \tag{27}$$

where c is calculated from $$\frac{\sigma_m}{\sigma} = 0.077 \tag{28}$$

$$\lambda_4 = 0.01639 \text{ sec}^{-1} \tag{29}$$
$$\lambda_{4m} = 0.002625 \text{ sec}^{-1} \tag{30}$$

and $S_D/(S_p+S_D)$ is reported in the literature by Banda & Nappi, in the article "Dynamic Compensation of Rhodium Self Powered Neutron Detectors", IEEE Trans. Nucl.Sci. NS-23, 311–316 (1976). It should be understood that the Banda et al article is not considered essential to a full and complete understanding of the present invention. Rather, the present invention is considered fully disclosed by the present patent application.

Fission chamber sensitivity changes after a cold start-up—and, in the case of bottom-entry detectors, after a change in power level or rod bank position—are very slow, requiring hours to reach completion. These slow fission-chamber current changes produce essentially, as a result, zero voltage output at the outputs of the differentiating circuits 15 (25) and 17 (27). Essentially zero error is produced in the output of summing amplifier 18 (28).

Whenever the potential fission-chamber contribution to the total signal differs from the values given by Equations (11) and (12) above, the output after a rapid neutron flux change can be in error. The error in the potential fission-chamber contribution can be present after a cold startup, and, in the case of bottom-entry detectors, after a change in power level or rod bank position. The error can be caused by improper adjustment of amplifiers 14 and 16, in the case of the embodiment of FIG. 1, or of amplifier 26, in the case of the embodiment of FIG. 6.

Table I, below, shows the output error, expressed as a percentage of the correct output, for a step change in power level from 80% to 100% of full power, vs. time after the step, for the cases of:
(1) potential fission-chamber contribution too small by 10%;
(2) potential fission-chamber contribution too large by 10%; and (3) no fission-chamber contribution.

TABLE I

OUTPUT ERROR AFTER POWER-LEVEL CHANGE FROM 80% TO 100% OF FULL POWER

| TIME | Error In Potential Fission-Chamber Contribution | | |
|---|---|---|---|
| | −10% | +10% | −100% |
| 0 | −1.86% | +1.86% | −18.60% |
| 10 sec. | −1.60% | +1.60% | −16.00% |
| 20 sec. | −1.38% | +1.38% | −13.79% |
| 40 sec. | −1.03% | +1.03% | −10.31% |
| 1 min. | −0.78% | +0.78% | −7.78% |
| 2 min. | −0.36% | +0.36% | −3.61% |
| 3 min. | −0.19% | +0.19% | −1.95% |
| 5 min. | −0.09% | +0.09% | −0.90% |
| 10 min. | −0.04% | +0.04% | −0.35% |

Table II, below, shows the output error, expressed as a percentage of the correct output, for an exponential power level increase from 100% of full power and at a 10-second period vs. time after the start of the increase, for the cases of:

(1) potential fission-chamber contribution too small by 10%;

(2) potential fission-chamber contribution too large by 10%; and (3) no fission-chamber contribution.

TABLE II

OUTPUT ERROR AFTER START OF 10-SECOND PERIOD POWER-LEVEL INCREASE FROM 100% OF FULL POWER

| TIME | Error In Potential Fission-Chamber Contribution | | |
|---|---|---|---|
| | −10% | +10% | −100% |
| 0 | 0 | 0 | 0 |
| 1 sec. | −0.88% | +0.88% | −8.78% |
| 2 sec. | −1.66% | +1.66% | −16.61% |
| 3 sec. | −2.36% | +2.36% | −23.59% |
| 4 sec. | −2.98% | +2.98% | −29.81% |
| 5 sec. | −3.54% | +3.54% | −35.36% |
| 6 sec. | −4.03% | +4.03% | −40.30% |
| 7 sec. | −4.47% | +4.47% | −44.70% |
| 8 sec. | −4.86% | +4.86% | −48.63% |
| 9 sec. | −5.21% | +5.21% | −52.13% |
| 10 sec. | −5.52% | +5.52% | −55.24% |

As can be seen from Tables I and II above and from FIG. 5, the present invention provides a linear power level measurement while also providing rapid response to detected changes in power level resulting from changes in reactor power level, changes in sensitivity after a cold start-up, and, in the case of bottom-entry detectors, changes in sensitivity after a change in rod bank position or power level. Accordingly, the present invention solves the problems of rapid response and precision measurement of in-core flux for nuclear reactor control.

The foregoing was provided for purposes of illustration and example. It will be appreciated that various equivalent embodiments of the invention can be produced depending on the specific reactor in which the invention is used. Therefore, the scope of the invention should be limited only by the breadth of the claims.

I claim:

1. Apparatus for in-core flux measurement and nuclear reactor control, comprising:

a self-powered neutron detector for producing an output signal corresponding to reactor power level;

first amplifier means having an input for receiving said neutron detector output signal and for producing a corresponding first amplifier output signal;

a fission chamber for producing an output signal corresponding to reactor power level;

second amplifier means having an input for receiving said fission chamber output signal and for producing a corresponding second amplifier output signal;

first differentiating means coupled to said second amplifier output for processing said second amplifier output signal according to the time constant $T_1/\ln 2$;

third amplifier means having an input for receiving said fission chamber output signal and for producing a corresponding third amplifier output signal;

second differentiating means coupled to said third amplifier means output for processing said third amplifier output signal according to the time constant $T_2/\ln 2$; and fourth amplifier means having corresponding inputs coupled to receive said first amplifier means output signal, said processed signal from said first differentiating means, and said processed signal from said second differentiating means, said fourth amplifier means operable to produce a summing output of said input signals.

2. The apparatus of claim 1, wherein said self-powered neutron detector comprises a rhodium neutron detector.

3. The apparatus of claim 1, said first differentiating circuit further comprising:

a capacitor coupled between said second amplifier output and said fourth amplifier input; and a resistor coupled between said fourth amplifier input and a circuit ground, whereby said differentiating circuit provides a time constant $T_1/\ln 2$ where $T_1$ is the half-life of the ground state of $Rh^{104}$.

4. The apparatus of claim 1, said second differentiating means further comprising:

a capacitor coupled between said third amplifier output and a corresponding fourth amplifier input; and a resistor coupled between said fourth amplifier input and a circuit ground, whereby said differentiating circuit provides a time constant $T_2/\ln 2$ where $T_2$ is the half-life of the isomeric state of $Rh^{104}$.

5. The apparatus of claim 1, wherein said fission chamber includes a regenerative sensitive coating consisting of a mixture of $U^{234}$ and $U^{235}$.

6. Apparatus for in-core flux measurement and nuclear reactor control, comprising:

a self-powered rhodium neutron detector for producing an output signal corresponding to reactor power level;

first amplifier means having an input for receiving said neutron detector output signal, said first amplifier means producing a corresponding first amplifier output signal ($V_1$);

a fission chamber for producing an output signal corresponding to reactor power level;

second amplifier means having an input for receiving said fission chamber output signal, said second amplifier means producing a corresponding second amplifier output signal ($V_2$) according to the equation:

$$V_2 = (1 - c)\frac{S_D}{S_p + S_D} V_1$$

where $S_D$ = delayed neutron sensitivity, and $S_p$ = the sum of prompt neutron sensitivity;
first differentiating means coupled to the output of said second amplifier means and including a capacitor and a resistor coupled to provide a time constant $T_1/\ln 2$, where $T_1$ is the half-life of the ground state of $Rh^{104}$;
third amplifier means having an input for receiving said fission chamber output signal, said third amplifier means producing a corresponding third amplifier output signal ($V_3$) according to the equation $$V_3 = c \frac{S_D}{S_p + S_D} V_1$$

second differentiating means coupled to the output of said third amplifying means and including a capacitor and a resistor coupled to provide a time constant $T_2/\ln 2$, where $T_2$ is the half-life of the isomeric state of $Rh^{104}$; and
fourth amplifier means including corresponding inputs for receiving the output of said first amplifier means, the processed output from said first differentiating circuit, and the processed output from said second differentiating circuit, and for producing a corresponding summed output signal.

7. Apparatus for in-core flux measurement and nuclear reactor control, comprising:
a self-powered neutron detector for producing an output signal corresponding to reactor power level;
first amplifier means, having an input receiving neutron detector output signal and for producing a corresponding amplifier output signal;
a fission chamber for producing an output signal corresponding to reactor power level;
second amplifier means having input for receiving said fission chamber output signal and for producing a corresponding second amplifier output signal;
first differentiating means coupled to said second amplifier output for processing said amplifier output signal according to the time constant $T_1/\ln 2$;
third amplifier means having an input for receiving said second amplifier output signal and for producing a corresponding third amplifier output signal;
second differentiating means coupled to said third amplifier output for processing said third amplifier output signal according to the time constant $T_2/\ln 2$; and
fourth amplifier means having corresponding inputs coupled to receive said first amplifier means output signal, said processed signal from said first differentiating means, and said processed signal from said second differentiating means, said fourth amplifier means operable to produce a summing output of said input signals.

8. The apparatus of claim 7, wherein said self-powered neutron detector comprises a rhodium neutron detector.

9. The apparatus of claim 7, said first differentiating circuit further comprising:
a capacitor coupled between said second amplifier output and said fourth amplifier input; and
resistor coupled between said fourth amplifier input and a circuit ground, whereby said differentiating circuit provides a time constant $T_1/\ln 2$ where $T_1$ is the half-life of the ground state of $Rh^{104}$.

10. The apparatus of claim 7, said second differentiating means further comprising:
a capacitor coupled between said third amplifier output and a corresponding fourth amplifier input; and
a resistor coupled between said fourth amplifier input and a circuit ground, whereby said differentiating circuit provides a time constant $T_2/\ln 2$ where $T_2$ is the half-life of the isomeric state of $Rh^{104}$.

11. The apparatus of claim 7, wherein said fission chamber includes a regenerative sensitive coating consisting of a mixture of $U^{234}$ and $U^{235}$.

12. Apparatus for in-core flux measurement and nuclear reactor control, comprising:
a self-powered rhodium neutron detector for producing an output signal corresponding to reactor power level;
first amplifier means having an input for receiving said neutron detector output signal, said first amplifier means producing a corresponding first amplifier output signal ($V_1$);
a fission chamber for producing an output signal corresponding to reactor power level;
second amplifier means having an input for receiving said fission chamber output signal, said second amplifier means producing a corresponding second amplifier output signal ($V_2$) according to the equation;

$$V_2 = (1-c) \frac{S_D}{S_p + S_D} V_1$$

where
$S_D$ = delayed neutron sensitivity; and
$S_p$ = the sum of prompt neutron sensitivity; and
first differentiating means coupled to the output of said second amplifier means including a resistor and a capacitor coupled to provide a time constant $T_1/\ln 2$ where $T_1$ is the half-life of the ground state of $Rh^{104}$;
third amplifier means having an input for receiving said second amplifier means output signal, said third amplifier means having a voltage gain of $(1-c)/c$;
second differentiating means coupled to the output of said third amplifying means and including a capacitor and resistor providing a time constant $T_2/\ln 2$ where $T_2$ is the half-life of the isomeric state of $Rh^{104}$; and
fourth amplifier means including corresponding inputs for receiving the output of said first amplifier means, a processed output from said first differentiating circuit, and a processed output from said second differentiating circuit, and for producing a corresponding summed output signal.

13. In an apparatus for in-core flux measurement and nuclear reactor control, and including a self-powered neutron detector for producing an output signal corresponding to reactor power level and a
fission chamber for producing a output signal corresponding to reactor power level, a circuit for producing a fission chamber compensated self-powered detector signal, comprising:
first amplifier means having an input for receiving said neutron detector output signal and for producing a corresponding first amplifier output signal;

second amplifier means having an input for receiving said fission chamber output signal and for producing a corresponding second amplifier output signal;

first differentiating means coupled to said second amplifier output and including a resistor and a capacitor coupled to provide a time constant $T_1/\ln 2$ where $T_1$ is the half-life of the ground state of $Rh^{104}$;

third amplifier means having an input for receiving said fission chamber output signal and for producing a corresponding third amplifier output signal;

second differentiating means coupled to said third amplifier means output and including a capacitor and resistor coupled to provide a time constant $T_2/\ln 2$ where $T_2$ is the half-life of the isomeric state of $Rh^{104}$; and fourth amplifier means having corresponding inputs coupled to receive said first amplifier means output signals, a processed signal from said first differentiating means, and a processed signal from said second differentiating means, said fourth amplifier means operable to produce a summing output of said input signals corresponding to reactor in-core neutron flux.

14. In an apparatus for in-core flux measurement and nuclear reactor control, including a self-powered neutron detector for producing an output signal corresponding to reactor power level and a fission chamber producing an output signal corresponding to reactor power level, a circuit for fission chamber compensation of a self-powered detector signal, comprising:

first amplifier means having an input for receiving said neutron detector output signal and for producing a corresponding first amplifier output signal;

second amplifier means having an input for receiving said fission chamber output signal and for producing a corresponding second amplifier output signal;

first differentiating means coupled to said second amplifier output and including a resistor and a capacitor coupled to provide a time constant $T_1/\ln 2$ where $T_1$ is the half-life of the ground state of $Rh^{104}$;

third amplifier means having an input for receiving said second amplifier means output signal and for producing a corresponding third amplifier output signal;

second differentiating means coupled to said third amplifier means output and including a capacitor and a resistor coupled to provide a time constant $T_2/\ln 2$ where $T_2$ is the half-life of the isomeric state of $Rh^{104}$; and fourth amplifier means having a corresponding input coupled to receive said first amplifier means output signal, a processed signal from said first differentiating means, and a processed signal from said second differentiating means, said fourth amplifier means operable to produce a summing output of said input signal corresponding to reactor in-core neutron flux.

15. A method for in-core flux measurement and nuclear reactor control, comprising the steps of:

receiving a signal from a self-powered neutron detector and producing a corresponding first output signal ($V_1$) with a first amplifier means;

receiving an output signal from a fission chamber and producing a corresponding second output signal ($V_2$) with a second amplifier means;

differentiating said second output signal according to the time constant $T_1/\ln 2$ where $T_1$ is the half-life of the ground state of $Rh^{104}$;

receiving said fission chamber output signal and producing a corresponding third output signal ($V_3$) with a third amplifier means;

differentiating said third amplifier means output signal according to the time constant $T_2/\ln 2$ where $T_2$ is the half-life of the isomeric state of $Rh^{104}$;

summing said first output signal, said first differentiated signal, and said second differentiated signal at a fourth amplifier means; and producing an output signal corresponding to reactor in-core neutron flux.

16. The method of claim 15, wherein said second amplifier means output signal is produced according to the equation:

$$V_2 = (1 - c) \frac{S_D}{S_p + S_D} V_1$$

where
$S_D$ = delayed neutron sensitivity, and
$S_p$ = the sum of prompt neutron sensitivity; and
wherein said third amplifier means output signal is produced according to the equation:

$$V_3 = c \frac{S_D}{S_p + S_D} V_1$$

17. A method for in-core flux measurement and nuclear reactor control, comprising the steps of:

receiving a signal from a self-powered neutron detector and producing a corresponding first output signal ($V_1$) with a first amplifier means;

receiving an output signal from a fission chamber and producing a corresponding second output signal ($V_2$) with a second amplifier means;

differentiating said second output signal according to the time constant $T_1/\ln 2$ where $T_1$ is the half-life of the ground state of $Rh^{104}$; p1 receiving said second output signal from said second amplifier means and producing a corresponding third output signal ($V_3$) with a third amplifier means;

differentiating said third amplifier means output signal according to the time constant $T_2/\ln 2$ where $T_2$ is the half-life of the isomeric state of $Rh^{104}$;

summing said first output signal, said first differentiated signal, and said second differentiated signal at a fourth amplifier means; and producing an output signal corresponding to reactor in-core neutron flux.

18. The method of claim 17, wherein said second amplifier means output signal is produced according to the equation:

$$V_2 = (1 - c) \frac{S_D}{S_p + S_D} V_1$$

where
$S_D$ = delayed neutron sensitivity, and
$S_p$ = the sum of prompt neutron sensitivity.

* * * * *